US011224783B1

(12) United States Patent
Robles et al.

(10) Patent No.: US 11,224,783 B1
(45) Date of Patent: Jan. 18, 2022

(54) SMART SPORTS EQUIPMENT AND INTEGRATED PLATFORM

(71) Applicant: DrillZBall LLC, Tomball, TX (US)

(72) Inventors: Jason Escalante Robles, Tomball, TX (US); Daniel Aguilar Marroquin, Houston, TX (US); David Rudy Mireles, Jr., Houston, TX (US); Jesse Courson Miller, Houston, TX (US); Daniel Aguilar Marroquin, Jr., Rosenberg, TX (US)

(73) Assignee: DRILLZBALL LLC, Tomball, TX (US)

( * ) Notice: Subject to any disclaimer, the term of this patent is extended or adjusted under 35 U.S.C. 154(b) by 0 days.

(21) Appl. No.: 17/368,262

(22) Filed: Jul. 6, 2021

Related U.S. Application Data

(60) Provisional application No. 63/049,055, filed on Jul. 7, 2020.

(51) Int. Cl.
*A63B 24/00* (2006.01)
*H04W 4/80* (2018.01)
*A63B 43/00* (2006.01)

(52) U.S. Cl.
CPC ...... *A63B 24/0075* (2013.01); *A63B 24/0021* (2013.01); *A63B 43/00* (2013.01); *H04W 4/80* (2018.02); *A63B 2024/0028* (2013.01); *A63B 2225/54* (2013.01)

(58) Field of Classification Search
USPC .............................................. 463/4; 473/354
See application file for complete search history.

(56) References Cited

U.S. PATENT DOCUMENTS

| | | | |
|---|---|---|---|
| 9,283,457 B2 | 3/2016 | Thurman et al. | |
| 10,195,513 B2* | 2/2019 | Tran | H04L 9/321 |
| 10,874,902 B1* | 12/2020 | Near | A63B 71/0622 |
| 10,997,251 B2* | 5/2021 | Tran | G06Q 20/308 |
| 2006/0148594 A1 | 7/2006 | Saintoyant et al. | |
| 2010/0144464 A1* | 6/2010 | VanDelden | A63B 37/0003 473/354 |
| 2014/0128171 A1 | 5/2014 | Anderson | |
| 2014/0266160 A1 | 9/2014 | Coza | |
| 2014/0371885 A1 | 12/2014 | Ianni et al. | |
| 2017/0251160 A1* | 8/2017 | Dibenedetto | A63F 13/56 |
| 2018/0117436 A1 | 5/2018 | Coza et al. | |

(Continued)

OTHER PUBLICATIONS

International Search Report and Written Opinion for International application No. PCT/US2021/040630, dated Oct. 19, 2021, 9 pages.

(Continued)

*Primary Examiner* — Pierre E Elisca
(74) *Attorney, Agent, or Firm* — Polsinelli PC

(57) ABSTRACT

Systems, methods, and non-transitory media are provided for smart sports equipment and integrated platforms. An example method can include receiving, by an integrated platform and from a client device, a request for content associated with a smart ball having a communications device configured to communicate an address for the content to one or more client devices, the request being based on the address from the smart ball; in response to the request, retrieving, by the integrated platform, the content associated with the smart ball; and providing, by the integrated platform, the content to the client device.

10 Claims, 11 Drawing Sheets

(56) References Cited

U.S. PATENT DOCUMENTS

2019/0036360 A1\* 1/2019 Zilles .................. H02J 50/10
2020/0330830 A1\* 10/2020 Carew-Jones ..... A63B 24/0021
2020/0398111 A1\* 12/2020 Near ................. G06K 7/10297
2021/0187362 A1\* 6/2021 Carew-Jones ..... A63B 37/0051

OTHER PUBLICATIONS

E. Alvarez, "DribbleUp's 'smart' soccer ball helps you train with an app" Endgadget article, Feb. 10, 2017. Retrieved on May 9, 2021, Retrieved from <URL: https://www.engadget.com/2017-10-02-dribbleup-smart-soccer-ball.html> entire document.

Nordic Semiconductor, "Bluetooth 5/Bluetooth LE Sensor Device enables smart cricket ball to track and deliver speed and movement data", Nordic Semiconductor article, Oct. 14, 2019. Retrieved on May 9, 2021 Retrieved from <URL: https://www.nordicsemi.com/News/2019/10/Sportcor-Smartball-employs-nRF52840-to-send-tracking-data-from-Kookaburra-Sports-Smartball-to-app> entire document.

\* cited by examiner

SMART SPORTS EQUIPMENT AND INTEGRATED PLATFORM

CROSS-REFERENCE TO RELATED APPLICATIONS

This application claims priority to U.S. Provisional Application No. 63/049,055, filed on Jul. 7, 2020, and entitled "SPORTS EQUIPMENT AND PLATFORM", the contents of which are incorporated herein by reference in their entirety and for all purposes.

TECHNICAL FIELD

The present disclosure generally relates to smart sports equipment and integrated platforms and, more specifically smart sports equipment and sports equipment connectivity to an integrated sports equipment platform.

BACKGROUND

Sports such as football, soccer, baseball, basketball, boxing, etc., are widely popular throughout the world. Such sports are widely played recreationally and competitively by individuals across different ages and age groups. Moreover, there are a large number of leagues, teams, training programs, tournaments, and facilities where users practice sports and compete with other individuals and teams, including locally, nationally, and globally. Equipment for different sports is also available use by teams and individuals in recreational and competitive settings. In some cases, configurations and/or aspects of available sports equipment for a particular sport can vary and/or can be designed for specific users, ages, leagues, goals, etc. For example, footballs can be sold in different sizes and configurations for different age groups. As another example, boxing gloves can be sold in different sizes and/or designed for different uses, such as larger boxing gloves designed for use in training and smaller boxing gloves designed for use in competition.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Figure 8:
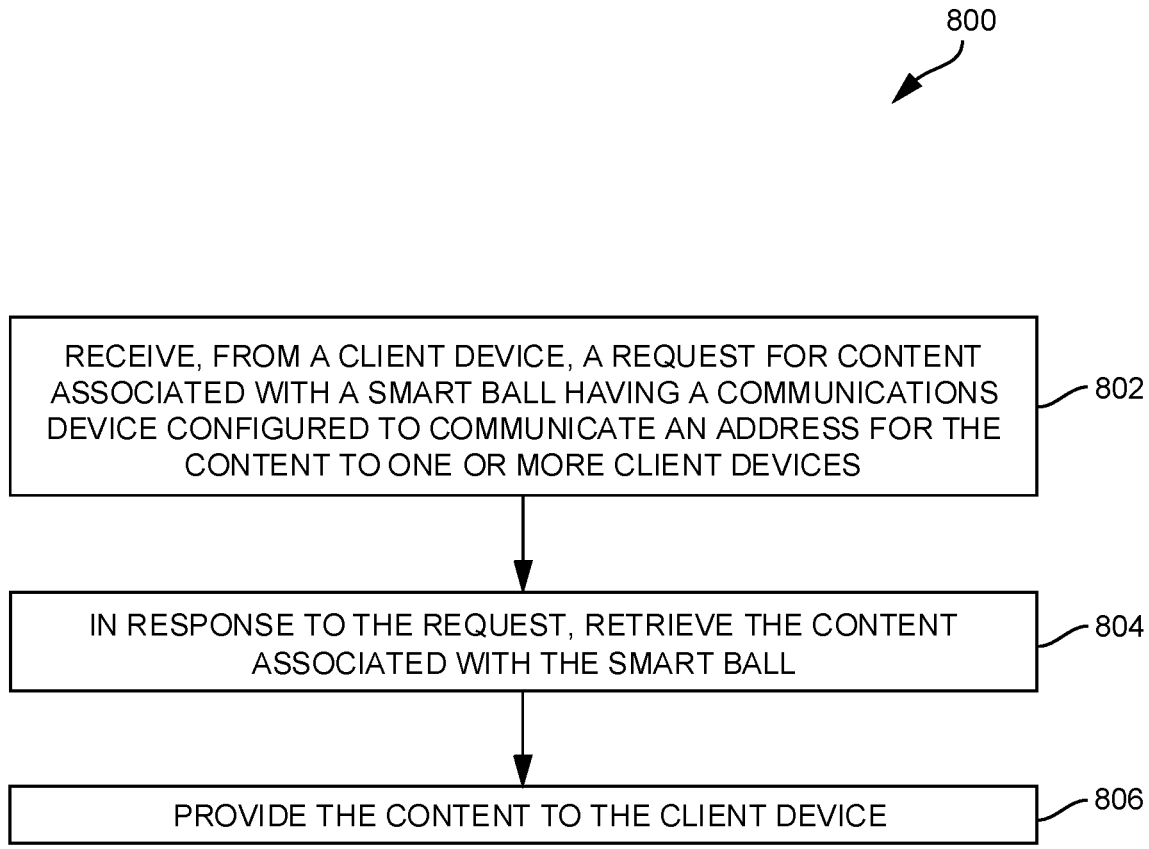
FIG. 8 is a flow diagram illustrating an example method for providing content associated with a smart ball, in accordance with some examples of the present disclosure.
Figure 9:
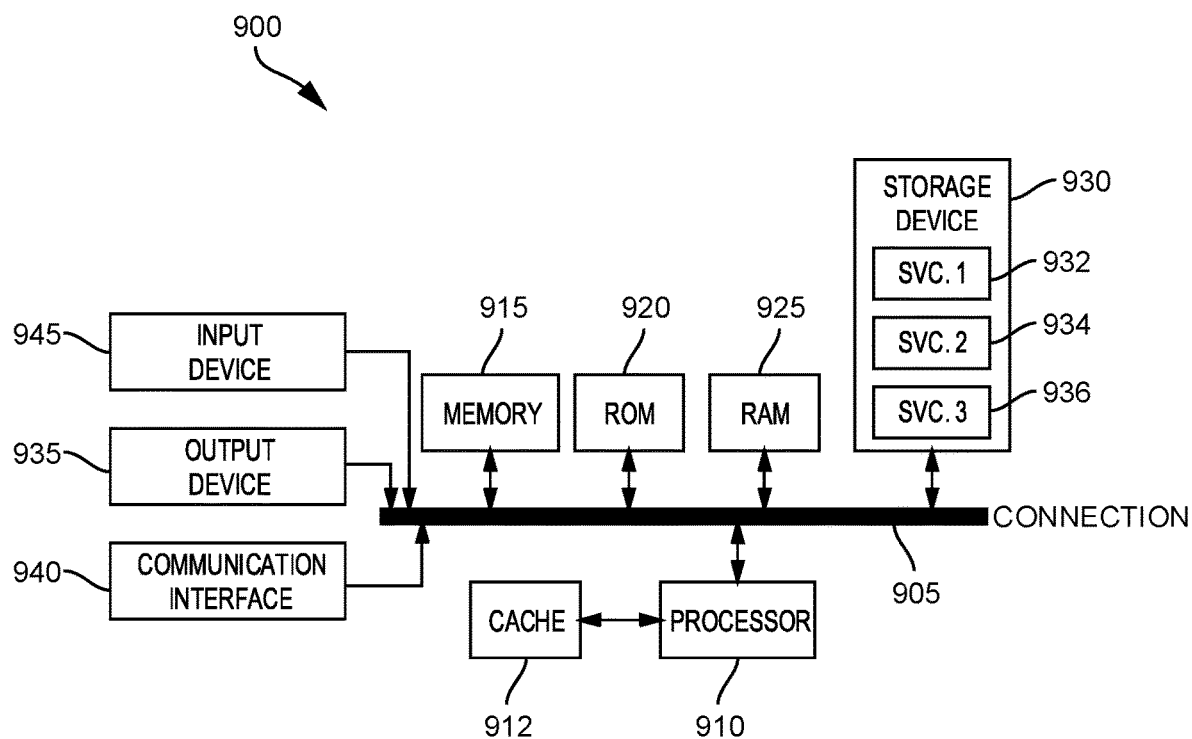
FIG. 9 illustrates an example computing device architecture, in accordance with some examples of the present disclosure.

The present technologies will be described in the following disclosure as follows. The discussion begins with a description of example smart sports equipment and sports equipment connectivity to integrated platforms and devices, as illustrated in FIG. 1 through FIG. 7B. A description of an example method for providing integrated content with smart sports equipment, as illustrated in FIG. 8, will then follow. The discussion concludes with a description of an example computing device architecture including example hardware components suitable for implementing an integrated platform and/or client devices for accessing an integrated platform, as illustrated in FIG. 9. The disclosure now turns to FIG. 1.

Figure 1:
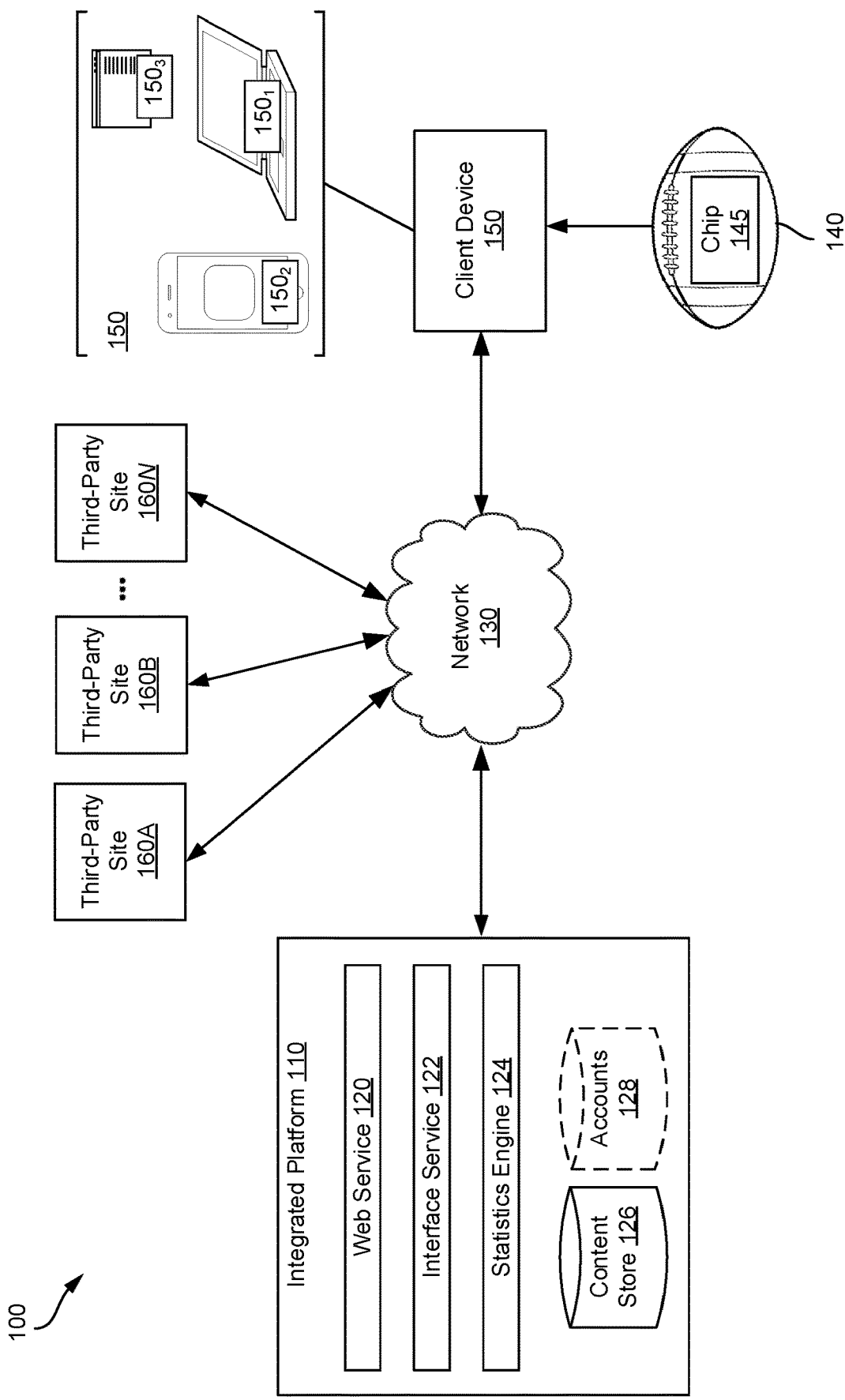
FIG. 1 is a simplified block diagram illustrating an example integrated sports system, in accordance with some examples of the present disclosure.

FIG. 1 is a block diagram illustrating an example integrated sports system 100, in accordance with some aspects of the disclosure. The integrated sports system 100 in this example includes a smart ball 140 having a chip 145 for communicating information, links, data (e.g., tailored or personalized content, statistics, analytics, sports-related content, etc.) and/or any other encoded data to client device 150 as well as any other client devices (e.g., 150$_1$, 150$_2$, 150$_3$), which client device 150 and/or the other client devices (e.g., 150$_1$, 150$_2$, 150$_3$) can use to access one or more pages, interfaces, features/functionalities, data (e.g., statistics, analytics, metrics, etc.), and/or content from the integrated platform 110.

The chip 145 can be installed, attached, integrated, coupled, and/or otherwise secured to any portion of the smart ball 140. For example, in some cases, the chip 145 can be installed on an inside/inner surface of the smart ball 140 so the chip 145 is not visible from the outside (or an outer surface of) the smart ball 140, does not protrude from the smart ball 140 (or from an outer surface of the smart ball 140), does not interfere with gripping or handling of the ball (via the outer surface of the smart ball 140), and/or is protected from outside elements (e.g., the environment, external forces, etc.).

The smart ball 140 can be any ball configured with the chip 145. In this example, the smart ball 140 is depicted as a football. The football is used herein as merely an illustrative example provided for explanation purposes. It should be noted that, in other examples, the chip 145 and concepts herein can be implemented with any other type of ball, sports equipment, etc. Non-limiting examples of other smart balls or smart sports equipment that can be implemented with the chip 145 can include a soccer ball, a rugby ball, a tennis ball, a volleyball, a baseball, a basketball, a sports glove, a helmet, a bat, a golf ball, among others.

The chip 145 can be any device or component capable of encoding digital information and communicating and/or transferring such information to receiver devices, such as client device 150 and/or any other client devices (e.g., client device $150_1$, client device $150_2$, client device $150_3$), wirelessly and/or without contact. For example, the chip 145 can include a near-field communication (NFC) tag or card or an NFC-enabled device, a proximity card, a radio frequency (RF) tag or card, a cellular communications card (e.g., a subscriber identity module (SIM) card), an integrated circuit with contactless or wireless communication capabilities (e.g., WIFI, Bluetooth, etc.), a contactless smart card, etc. In some cases, the chip 145 can communicate and/or transfer information to the client device 150 using wireless signals (e.g., radio-frequency signals, etc.) and/or resonant energy transfer when the client device 150 is within a certain range of the chip 145 in the smart ball 140.

As previously noted, the chip 145 can store and/or can encode information that the client device 150 and any other client devices (e.g., $150_1$, $150_2$, $150_3$) can read, access, retrieve, and/or receive from the chip 145. The chip 145 can store and/or encode such information via a magnetic stripe, a computer-readable medium, an integrated circuit, and/or any digital data storage/memory element. The chip 145 can store or encode any information that can instruct the client device 150 and/or any other client devices (e.g., $150_1$, $150_2$, $150_3$) how to access content from the integrated platform over the network 130 and/or trigger the client device 150 and/or any other client devices to access the content from the integrated platform and/or directed the client device 150 and/or other client devices to the content. In some examples, the stored or encoded information can include instructions or links configured to trigger, direct, or prompt the client device 150 and/or any other client devices (e.g., $150_1$, $150_2$, $150_3$) to access content from the integrated platform over the network 130. Non-limiting examples of information that can be stored or encoded in the chip 145 include one or more addresses (e.g., uniform resource locators (URLs), uniform resource identifiers (URIs), Internet Protocol (IP) addresses, pointers, links or paths, identifiers, codes (e.g., QR codes, barcodes, access codes, etc.), user information, sports information, ball information, information associated with the integrated platform 110, social media information, tags, sensor measurements, code, etc.

In some examples, the information stored or encoded in the chip 145 and/or the content in the integrated platform 110 associated with the chip 145 (e.g., accessible via information stored or encoded in the chip 145) can be based on one or more characteristics of the smart ball 140. For example, the information can be specific to the type of smart ball (e.g., football, soccer, basketball, volleyball, tennis ball, etc.), the size of the smart ball (e.g., age-specific or age-range specific size, league-specific size, region/country-specific size, tournament-specific size, etc.), the brand of the smart ball, the configuration of the smart ball, the age(s) and/or size(s) of user for which the smart ball is designed for (e.g., ages 5-7, ages 8-10, ages 12-14, ages 15-18, adult, ages 5-10, ages 15 to adult, etc.), the league(s) that the smart ball is designed for (e.g., youth league, adult league, minor league, professional league, etc.), etc.

In some examples, the smart ball 140 can include one or more sensors for capturing sensor data. The one or more sensors can be included in an inside portion of the smart ball 140. For example, in some cases, the one or more sensors can be attached or coupled to a surface on the inside of the smart ball 140. The one or more sensors can include, for example and without limitation, an accelerometer, a gyroscope, a magnetometer, a barometer, a pressure sensor (e.g., a pounds per square inch (PSI) sensor), an audio sensor, a force or impact sensor, etc. For example, in some cases, the smart ball 140 can include an inertial measurement unit (IMU) and/or a barometer to measure an elevation, speed, velocity, and/or trajectory of the smart ball 140, which can be used to capture statistics and/or generate analytics associated with a use of the smart ball 140. As another example, in some cases, the smart ball 140 can include a force or impact sensor to capture forces, impacts, vibrations, shocks, etc., applied to the smart ball 140, which can be used to capture statistics and/or generate analytics associated with a use of the smart ball 140. As another example, in some cases, the smart ball 140 can include a PSI sensor to capture measurements of a pressure of the smart ball 140. In some cases, information from the one or more sensors can be stored or encoded in the chip 145 for access by the client device 150 and/or other client devices.

In some cases, one or more sensors (e.g., accelerometer, gyroscope, magnetometer, barometer, pressure sensor (e.g., PSI sensor), audio sensor, force or impact sensor, etc.) for capturing sensor data can be attached to a player(s) to obtain metrics/statistics associated with that player(s). In some examples, the one or more sensors attached to the inside of the smart ball 140 and/or the one or more sensors attached to the player(s) can be used to record and/or track the flight/path/movement of the smart ball 140 and/or the path/movement of the player(s). In some cases, the recorded/tracked movement of the smart ball 140 and/or the player(s) can be displayed and/or visualized in video data on the integrated platform 110. For example, the recorded/tracked movement of the smart ball 140 and/or the player(s) can be used to display/visualize a movement of the smart ball 140 and/or the player(s) using tracers included in a video recording capturing the movement of the smart ball 140 and/or the player(s). The tracers can include graphics and/or image data that visualizes a path/movement of the smart ball 140 and/or the player(s) within a video recording. The video recording with the tracers can be available from the integrated platform 110. To illustrate, in some examples, the integrated platform 110 can include one or more videos recording a player throwing a ball at a target or multiple player movements on the field and showing their paths. In some cases, the one or more video recordings can also record and/or visualize the path of the smart ball 140. In some cases, the one or more sensors can be used to measure and visualize/trace the routes of players on the field.

In some cases, the sensor data can be used to assess a player performance and/or evaluate a player. For example, assume there is a competition between quaterbacks where two quarterbacks throw a smart ball at a same target. The one or more sensors can be used to measure movement of the smart ball and/or the quarterback. The sensor data can be used to generate and display tracers depicting the movement. The tracers (e.g., along with relevant statistics such as speed, rotations, etc.) of any attempts of each quarterback can be used to evaluate the quaterbacks' performance and/or distinguish performances between the two quaterbacks. In another example, the tracers along with relevant statistics can be used to evaluate the tracer patterns and other statistics (e.g., speed, acceleration, etc.) of different running backs and/or distinguish between the running performance of the running backs.

In some cases, the information stored or encoded in the chip 145 and the content accessible on the integrated platform 110 through the information stored or encoded in the chip 145 can be specific to the type of smart ball 140, such as the size of the ball, the age-group the ball is designed for, and/or league associated with the ball. Thus, through information obtained or retrieved from the chip 145, the client device 150 and/or any other client devices (e.g., $150_1$, $150_2$, $150_3$) can access (and/or be automatically directed to) specific content on the integrated platform 110 that is associated with, mapped to, corresponding to, and/or configured for the specific type (e.g., size, age-group, league, configuration, sport, etc.) of smart ball 140 (and/or users of the smart ball 140).

The client device 150 (and client devices $150_1$, $150_2$, $150_3$) can include any computing device with networking capabilities and with capabilities for receiving and/or retrieving/reading information from the chip 145 in the smart ball 140. Non-limiting examples of a client device can include a smartphone, a laptop computer, a desktop computer, a tablet computer, an IoT (Internet of Things) device, a smart wearable device (e.g., a smart watch, smart glasses, a head-mounted display (HMD), etc.), a mobile device, a game system, etc. Different users, such as players, coaches, parents, administrators, athletes, students, etc., can use a respective client device (e.g., e.g., client device $150_1$, client device $150_2$, client device $150_3$) to receive and/or retrieve/read information from the chip 145 on the smart ball 140 and access associated content from the integrated platform 110. In some examples, a user(s) can use the client device 150 to access different content on the integrated platform 110 based on information received and/or retrieved/read from different chips (e.g., chip 145) on different smart balls (e.g., smart ball 140).

The client device 150, the integrated platform 110, and/or third-party sites 160A-N (collectively "160" hereinafter) can communicate with each other via network 130. Network 130 can include one or more private and/or public networks such as, for example and without limitation, a local area network (LAN), a wide area network (WAN), a private cloud, a public cloud, a hybrid cloud, a virtual private network (VPN), a wireless network, the Internet, etc.

The third-party sites 160 can include any third-party content site, domain, application, and/or website, such as social media/network sites, blogs, electronic commerce sites, media content sites, streaming sites, entertainment sites, etc. For example, in some cases, the third-party sites 160 can represent social media sites where users can access content, post and/or upload content, collaborate, interact, etc. To illustrate, the third-party sites 160 can include social media networks where users can post and/or read messages and/or comments, upload/post and/or access videos, upload/post and/or access audio content, upload/post and/or access images, upload/post and/or access documents, message other users (live and/or on demand), upload/post and/or access links to other sites (such as links to content on the integrated platform 110), etc.

In some cases, the third-party sites 160 can interface with the integrated platform 110 to allow content (e.g., messages, videos, files, posts, audio, images, etc.) on the third-party sites 160 to be linked to, uploaded/downloaded to, retrieved from, and/or shared with the integrated platform 110, and/or vice versa. For example, a video, message, link, post, image, audio, and/or file posted on third-party site 160A can be linked to, uploaded/downloaded to, retrieved from, and/or shared with the integrated platform 110. This can allow the client device 150 to access content originating and/or hosted on the third-party sites 160 from and/or through the integrated platform 110, and/or vice versa.

In some cases, content can be linked, uploaded/downloaded, accessed, shared, etc., between the third-party sites 160 and the integrated platform 110 manually (e.g., via a user input/request, link, hashtag, etc.) and/or automatically. Moreover, in some examples, the third-party sites 160 can interface with the integrated platform 110 via interface service 122 on the integrated platform 110. Interface service 122 can include one or more routes, endpoints, servers, interfaces, processes/services, etc., for communicating and/or integrating with the third-party sites 160. For example, in some cases, the interface service 122 can include one or more application programming interfaces (APIs).

As previously noted, the integrated platform 110 can host content associated with the chip 145, the smart ball 140, and/or a user/team associated with the smart ball 140, which the client device 150 and any other client devices (e.g., $150_1$, $150_2$, $150_3$) can access via information (e.g., a link, an address, a path, a pointer, instructions, etc.) encoded on the chip 145 and received/retrieved by the client device from the chip 145 when the client device is within a certain range of the chip 145. In some examples, the client device 150 can upload and/or access content (e.g., videos, web pages, audio, messages, posts, blogs, manuals, files, tutorials, images, animations, instructions, interfaces, text, etc.) to/from the integrated platform 110 via the web service 120. In some cases, a user associated with the smart ball 140 can input data in the integrated platform 110, such as personalized data, content suggestions, media content (e.g., videos, audio, messages, etc.), statistics, recommendations, instructions, etc.

In some cases, the web service 120 can host and/or provide one or more websites associated with the integrated platform 110. Moreover, the web service 120 can host and/or provide web content such as, for example, videos, web pages, audio, messages, posts, blogs, manuals, files, tutorials, images, animations, instructions, feeds, text, streams, analytics, statistics, sensor data, data submitted by a user(s), sports information, schedules, competition data, training data, etc. As further described herein, in some examples, the web service 120 can host and/or provide web pages and/or websites containing content related to the smart ball 140. For example, the web service 120 can host instructional content (e.g., guides, tutorials, animations, instructions, tips, illustrations/demonstrations, examples, etc.) for a sport associated with the smart ball 140, such as plays, training drills, practice plans, coaching plans, game plans, warm-up plans, playbooks, etc. The web service 120 can also host any other type of content such as, for example, highlights, games, contests, competitions, personalized content, links, blogs, rated content, posts, tips, statistics, team information, etc.

The web service 120 can host content tailored to, and/or associated with, different smart balls, such as different types of smart balls. For example, the content hosted for a specific smart ball can be tailored and/or related to the sport (e.g., football, basketball, soccer, tennis, volleyball, baseball, etc.)

associated with the ball. In some examples, the content hosted for a specific smart ball can be tailored and/or related to one or more features of the ball. For example, in some cases, smart balls for a particular sport can have different configurations (e.g., sizes, materials, weight, etc.) designed for different uses and/or users, such as different age groups, leagues, geographic regions, competitive levels, purposes (e.g., competition, training, entertainment/non-competitive purposes, etc.), and so forth. Accordingly, the content hosted by the web service 120 for a particular smart ball can not only include content specific to the sport associated with the ball but also the use(s) and/or user(s) associated with the ball.

To illustrate, footballs can have different sizes designed for different age groups, where footballs designed for younger users are smaller than footballs designed for older users. Thus, if a smart football (e.g., smart ball 140) is a certain size corresponding to users of a particular age group, the content hosted by the web service 120 for that football and accessible through the chip (e.g., 145) implemented by that football can include football content tailored and/or related to that particular age group. For example, a chip (e.g., chip 145) on a smart football (e.g., smart ball 140) of a certain size designed for kids ages 5-10 can provide client device (e.g., client device 150) access to football content on the integrated platform 110 that includes content tailored to kids ages 5-10, such as instructional content for kids ages 5-10.

In some cases, content hosted by the web service 120 and accessible through the chip (e.g., 145) implemented by a smart ball can be tailored to a specific user, league, team, division, etc. For example, the web service 120 can include content tailored to a specific user, such as user statistics, user training program, user competitions and/or games, user drills, user instructions, user videos, user posts, user plays, user suggestions, user preferences, user team(s), user contacts/connections, user plans (e.g., practice, training, game, etc.), user progress information, etc. In some examples, such tailored content can be accessed by the user through the client device 150 from the information provided by the chip (e.g., chip 145) on the smart ball. In some cases, when the user accesses the integrated platform 110 through the chip on the smart ball, the user's tailored content can be provided and/or accessed from the portal and/or landing page/site. In other cases, the user may be directed to a page where the user can login and/or authenticate to access content tailored for that user.

The integrated platform 110 can include a statistics engine 124 that can compute statistics presented by the web service 120 and/or used to tailor and/or modify content presented by the web service 120. In some cases, the statistics engine 124 can track and/or report traffic to the content hosted by the web service 120 and/or any other activity associated with the integrated platform 110 and/or the content associated with the integrated platform 110. For example, the web service 120 can track session duration, pages per session, conversions of advertisement content (e.g., Ads), views of instructional content and/or any other content (e.g., videos, images, web pages, posts, blogs, etc.), source traffic (e.g., source sites), destination traffic (e.g., destination sites), sites having content linked to or referencing the integrated platform 110, etc. In some cases, statistics can be used to rate and/or order content on the integrated platform 110, update (e.g., add, modify, remove) content on the integrated platform 110, tailor content to a particular user and/or audience, rank instructional content, etc.

In some examples, the statistics engine 124 can maintain and/or process statistics provided by users to the integrated platform 110. For example, in some cases, users can provide game statistics to the integrated platform 110. The statistics engine 124 can analyze, store, process, and/or manipulate the user-provided statistics (e.g., the game statistics) and/or combine such statistics with statistics from one or more other sources, such as the Internet. In one illustrative example, the statistics engine 124 can use the game statistics entered by a user(s) to track game statistics and information, identify patterns (e.g., game patterns, play patterns, player patterns, league patterns, age-related patterns, sport-related patterns, etc.), rank players (e.g., by region, league, age and/or age group, division, sport, overall, and/or in any other way), rank teams, rank plays, and/or track and/or compute any other relevant statistics.

The integrated platform 110 can include a content store 126 used to store any data hosted by the integrated platform 110, such as web pages, instructional content, statistics, logs, uploaded content, preferences, websites, etc. The content store 126 can include one or more storage devices and/or components, such as one or more storage drives, storage volumes, databases, stores, storage systems, storage servers, etc. The content store 126 can be hosted or implemented by a single system or multiple systems. For example, the content store 126 can be hosted or implemented by a single storage server system or distributed across multiple storage server systems.

In some cases, the integrated platform 110 can include an accounts store 128, which can store accounts registered on the integrated platform 110, such as user accounts, team accounts, administrator accounts, league accounts, etc. Moreover, in some aspects, the accounts store 128 can store account-related information such as, for example, authentication information, account preferences, account statistics, account data, account history, account logs, etc. The accounts store 128 can include one or more storage devices and/or components, such as one or more storage drives, storage volumes, databases, stores, storage systems, storage servers, etc. The accounts store 128 can be hosted or implemented by a single system or multiple systems. For example, the accounts store 128 can be hosted or implemented by a single storage server system or distributed across multiple storage server systems. In some cases, the accounts store 128 can be hosted or implemented by the same system or systems as the content store 126. In other cases, the accounts store 128 and the content store 126 can be hosted or implemented by separate systems.

The integrated platform 110 can include one or more physical and/or virtual/logical nodes, networks, and/or computing devices. For example, in some cases, the integrated platform 110 can include, without limitation, one or more servers, storage systems, virtual machines (VMs), software containers, service chains, compute resources, datacenters, networks, etc. In some examples, the integrated platform 110 can be hosted in one or more networks, such as one or more private networks, datacenters, clouds, etc.

In some examples, the web service 120, the interface service 122, and the statistics engine 124 can be implemented by one or more compute components. The one or more compute components can include, for example, a central processing unit (CPU), a graphics processing unit (GPU), a digital signal processor (DSP), an application-specific integrated circuit (ASIC), etc.

While the integrated platform 110 is shown to include certain components, one of ordinary skill will appreciate that the integrated platform 110 can include more or fewer components than those shown in FIG. 1. For example, the integrated platform 110 can also include, in some instances, one or more memory devices (e.g., RAM, ROM, cache, and/or the like), one or more networking interfaces (e.g., wired and/or wireless communications interfaces and the like), one or more display devices, one or more other processing engines (e.g., machine learning engines, application content engine, processing engine, content delivery engine, etc.), and/or other hardware or processing devices that are not shown in FIG. 1. An illustrative example of a computing device and hardware components that can be implemented with the integrated platform 110 is described below with respect to FIG. 9.

Moreover, while FIG. 1 only shows one smart ball 140 and is described with respect to client device 150, one of ordinary skill will appreciate that other examples can include multiple smart balls, including multiple types of balls and/or ball configurations, and multiple client devices. Also, while FIG. 1 is described with respect to a smart ball implementing the chip 145, one of ordinary skill will appreciate that the chip 145 can be implemented in other objects and/or sports equipment such as, for example, gloves, bats, hats, uniforms, helmets, etc. The smart ball 140 and the client device 150 are provided herein as non-limiting, simplified examples for illustration and explanation purposes.

Figure 2:
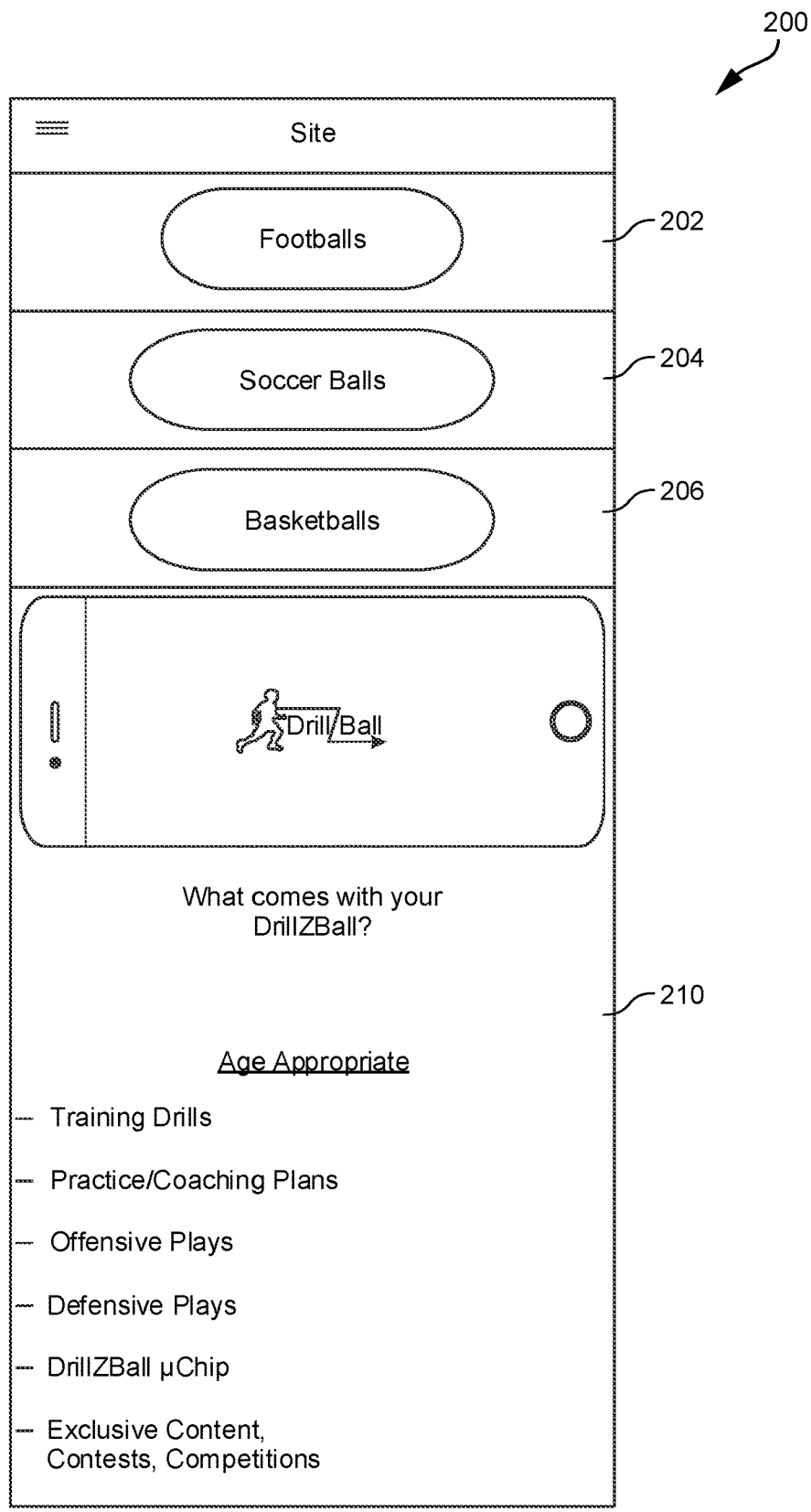
FIG. 2 is a diagram illustrating an example interface of content hosted by an integrated platform in an integrated sports system, in accordance with some examples of the present disclosure.

FIG. 2 is a diagram illustrating an example interface 200 of content hosted by the integrated platform 110. In some examples, the interface 200 can be a web page or website hosted by the web service 120. In other examples, the interface 200 can be an application interface for content hosted by the integrated platform 110.

In some cases, the interface 200 can be a portal or site hosted by the integrated platform 110 where users can access information about smart balls and/or objects. As previously explained, smart balls can include sports balls configured with a chip for accessing the integrated platform 110, such as smart ball 140 shown in FIG. 1. Moreover, as used herein, smart objects can refer to objects having a chip for accessing the integrated platform 110, such as sports equipment, sports apparel, or any other objects. In some cases, as described herein, smart balls and smart objects can also include other hardware such as, for example, sensors (e.g., inertial measurement units, pressure sensors (e.g., pounds per square inch (PSI) sensors), barometric sensors, force or impact sensors, etc.).

For example, the interface 200 can be a portal or page where users can go to purchase smart balls and/or objects and/or access information about smart balls and/or objects. To illustrate, the interface 200 can include a footballs section 202 where users can access information about and/or associated with smart footballs and/or purchase smart footballs, a soccer balls section 204 where users can access information about and/or associated with smart soccer balls and/or purchase smart soccer balls, a basketballs section 206 where users can access information about and/or associated with smart basketballs and/or purchase smart basketballs, and/or sections for any other types of smart balls and/or objects.

In some examples, the interface 200 can include an information section 210 which can provide information about smart balls and/or smart objects. For example, the information section 210 can describe functionalities, features, and/or content associated with one or more smart balls and/or smart objects. In some cases, information included in the information section 210 can be selectable to allow users to navigate to more granular information about the selected information. For example, the information section 210 can include a list of content items included in smart balls, and users can select any content items to navigate to more detailed information about that content item. To illustrate, the list of content items can include training drills, which users can select to drill down and access more detailed information about training drills, such as example training drills, training drill reviews/ratings, etc.

In some cases, the interface 200 can be accessed by the client device 150 through a network, such as the Internet. In some examples, the interface 200 can be accessed by the client device 150 through a specific domain address and/or based on information (e.g., URL, URI, address, path, instructions, etc.) wirelessly obtained by the client device 150 from the chip 145 on the smart ball 140 when the client device 150 is within a range of the chip 145. The client device 150 can access the interface 200 through a web browser, an application on the client device 150, and/or by any other means.

Figure 3A:
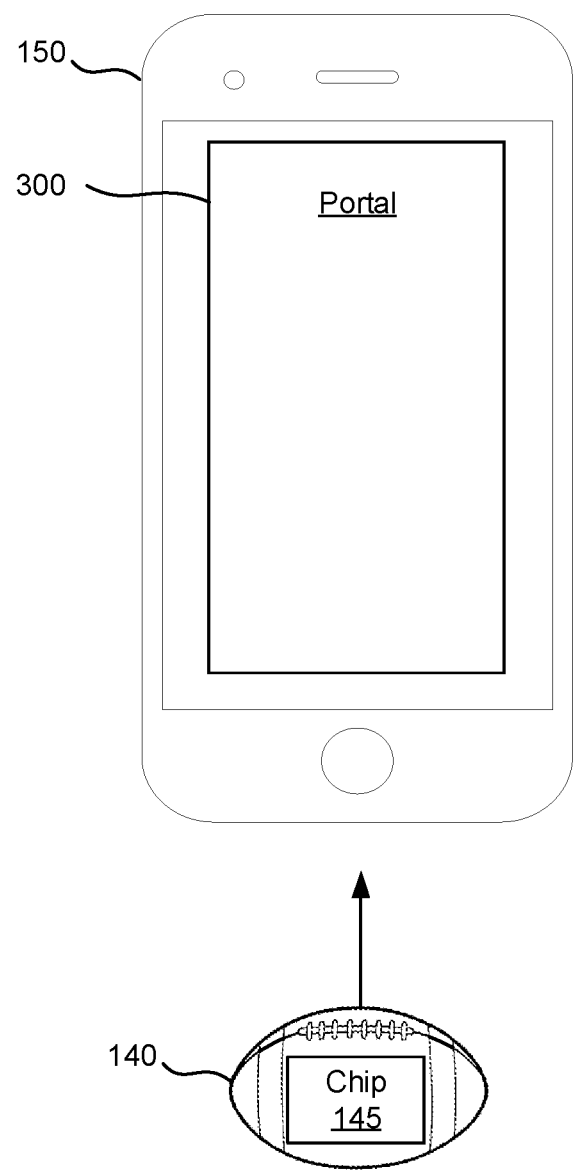
FIG. 3A is a diagram illustrating an example use case of a smart ball, in accordance with some examples of the present disclosure.

FIG. 3A is a diagram illustrating an example use case of smart ball 140. In this example, a user can place the client device 150 and smart ball 140 within a certain range of each other to allow the client device 150 to receive/retrieve information encoded and/or stored in the chip 145 of the smart ball 140. The range can be based on a wireless range of the chip 145. In some cases, the wireless range of the chip 145 may vary based on the specific chip (e.g., the type of chip, the protocol implemented by the chip, hardware and/or circuitry of the chip, a configuration of the chip, a wireless interface of the chip, power capabilities of the chip, an amount of power used/available by/to the chip such as through a battery or wireless signals from the client device 150, a radio frequency used by the chip, etc.).

When the client device 150 and the chip 145 in the ball 140 are within the wireless range, the client device 150 can obtain information from the chip 145 for accessing the integrated platform 110. The client device 150 can use such information to access (or trigger an access) of the integrated platform 110 through one or more networks, such as network 130. In this example, upon obtaining the information from the chip 145, the client device 150 has accessed a portal 300 on the integrated platform 110. The portal 300 can be a specific interface, page, and/or website associated with the information obtained from the chip 145, such as a landing page associated with a URL obtained from the chip 145. The user of the client device 150 can then access content associated with the smart ball 140 through the portal 300, as further described herein.

Figure 3B:
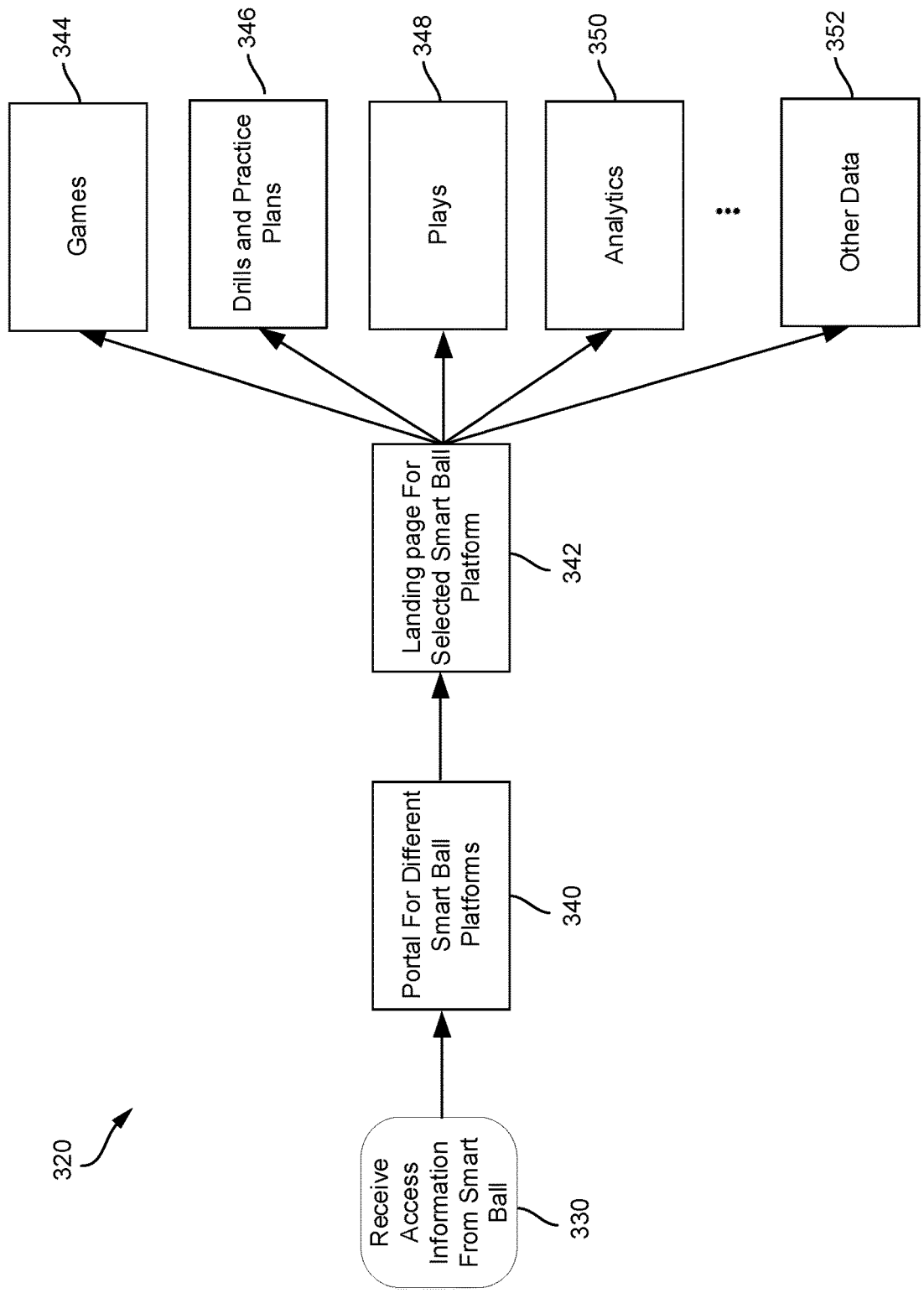
FIG. 3B is a diagram illustrating an example site map associated with a website accessible by a client device using information from a chip on a smart ball, in accordance with some examples of the present disclosure.

FIG. 3B illustrates an example site map 320 associated with a website accessible by the client device 150 using information from the chip 145 on the smart ball 140. In this example, the client device 150 can receive 330 access information from the chip 145 for accessing a site from the integrated platform 110, such as a link or address. In some examples, the client device 150 can obtain the access information from the chip 145 on the smart ball 140 when a user of the client device 150 taps the client device 150 on the smart ball 140, uses the client device 150 to scan the smart ball 140, and/or brings the client device 150 within a proximity/range of the smart ball 140.

Using the access information from the chip 145, the client device 150 can access a portal 340 on the integrated platform 110. In some examples, the client device 150 can access the portal 340 using a local application on the client device 150, such as an application from the integrated platform 110, a web application, etc. In some cases, the client device 150 can access the portal 340 using a web browser on the client device 150.

The portal 340 can provide access to different smart ball platforms and/or portals. For example, the portal 340 can provide access (e.g., links, transition pages, etc.) to smart ball platforms for different age groups, sports, leagues, teams, etc. In some examples, the portal 340 can include interface elements for accessing age-specific or age-group specific smart ball platforms or portals for a particular sport associated with the smart ball 140.

When a user of the client device 150 selects a specific smart ball platform or portal from the different smart ball platforms and/or portals accessible through the portal 340, the client device 150 can be directed to a landing page 342 for the selected smart ball platform or portal. The landing page 342 can provide access to specific sections, pages, content, portions, etc., of the selected smart ball platform or portal. In the example shown in FIG. 3B, the landing page 342 can provide access to a games area 344, a drills and practice plans area 346, a plays area 348, an analytics area 350, and/or other data area 352. In some examples, the games area 344, the drills and practice plans area 346, the plays area 348, the analytics area 350, and the other data area 352 can represent different web pages, portals, websites, and/or site regions for associated content such as games, drills and practice plans, plays, analytics, and/or other content.

In some cases, the other data area 352 can include a blog(s), a messaging site, a content upload site, sensor data captured by one or more sensors on the smart ball 140 (e.g., smart ball air pressure, smart ball state and/or motion information (e.g., speed/velocity, trajectory, elevation, etc.), force or impact measurements, etc.), data submitted by one or more users (e.g., suggestions, comments, preferences, recommendations, statistics, requests, profile information, team information, schedules, scores, goals, plans, etc.), one or more resources and/or links to one or more resources, etc. In some cases, the data submitted by one or more users can include one or more plays, drills, and/or exercises created/designed by a user associated with the smart ball 140. In some examples, the other data area 352 can include PSI measurements obtained by one or more sensors on the smart ball 140. The PSI measurements can provide a measured pressure of the smart ball 140 at one or more times, which the user can access/view from the other data area 352.

In some examples, the other data area 352 can display video and other data about a movement/use of the smart ball 140 and/or a movement/performance of a player. For example, in some cases, one or more sensors (e.g., accelerometer, gyroscope, magnetometer, barometer, pressure sensor (e.g., PSI sensor), audio sensor, force or impact sensor, etc.) for capturing sensor data can be attached to an inside of the smart ball 140 and/or a player(s) (e.g., to a uniform and/or equipment of the player) to obtain metrics/statistics associated with that smart ball 140 and/or that player(s). In some examples, the one or more sensors attached to the inside of the smart ball 140 and/or the one or more sensors attached to the player(s) can be used to record and/or track the flight/path/movement of the smart ball 140 and/or the path/movement of the player(s). In some cases, the recorded/tracked movement of the smart ball 140 and/or the player(s) can be displayed and/or visualized in video data available on the other data area 352. For example, the recorded/tracked movement of the smart ball 140 and/or the player(s) can be used to display/visualize a movement of the smart ball 140 and/or the player(s) using tracers included in a video recording capturing the movement of the smart ball 140 and/or the player(s). The tracers can include graphics, an animation, and/or image data that visualizes a path/movement of the smart ball 140 and/or the player(s) within a video recording. The video recording with the tracers can be available from the other data area 352. To illustrate, in some examples, the other data area 352 can include one or more videos recording a player throwing a ball at a target or multiple player movements on the field and showing their paths. In some cases, the one or more video recordings can also record and/or visualize the path of the smart ball 140. In some cases, the one or more sensors can be used to measure and visualize/trace the routes of players on the field.

In some cases, the sensor data can be used to assess a player performance and/or evaluate a player. For example, assume there is a competition between quaterbacks where two quarterbacks throw a smart ball at a same target. The one or more sensors can be used to measure movement of the smart ball and/or the quarterback. The sensor data can be used to generate and display tracers depicting the movement. The tracers (e.g., along with relevant statistics such as speed, rotations, etc.) of any attempts of each quarterback can be used to evaluate the quaterbacks' performance and/or distinguish performances between the two quaterbacks. In another example, the tracers along with relevant statistics can be used to evaluate the tracer patterns and other statistics (e.g., speed, acceleration, etc.) of different running backs and/or distinguish between the running performance of the running backs.

Figure 4:
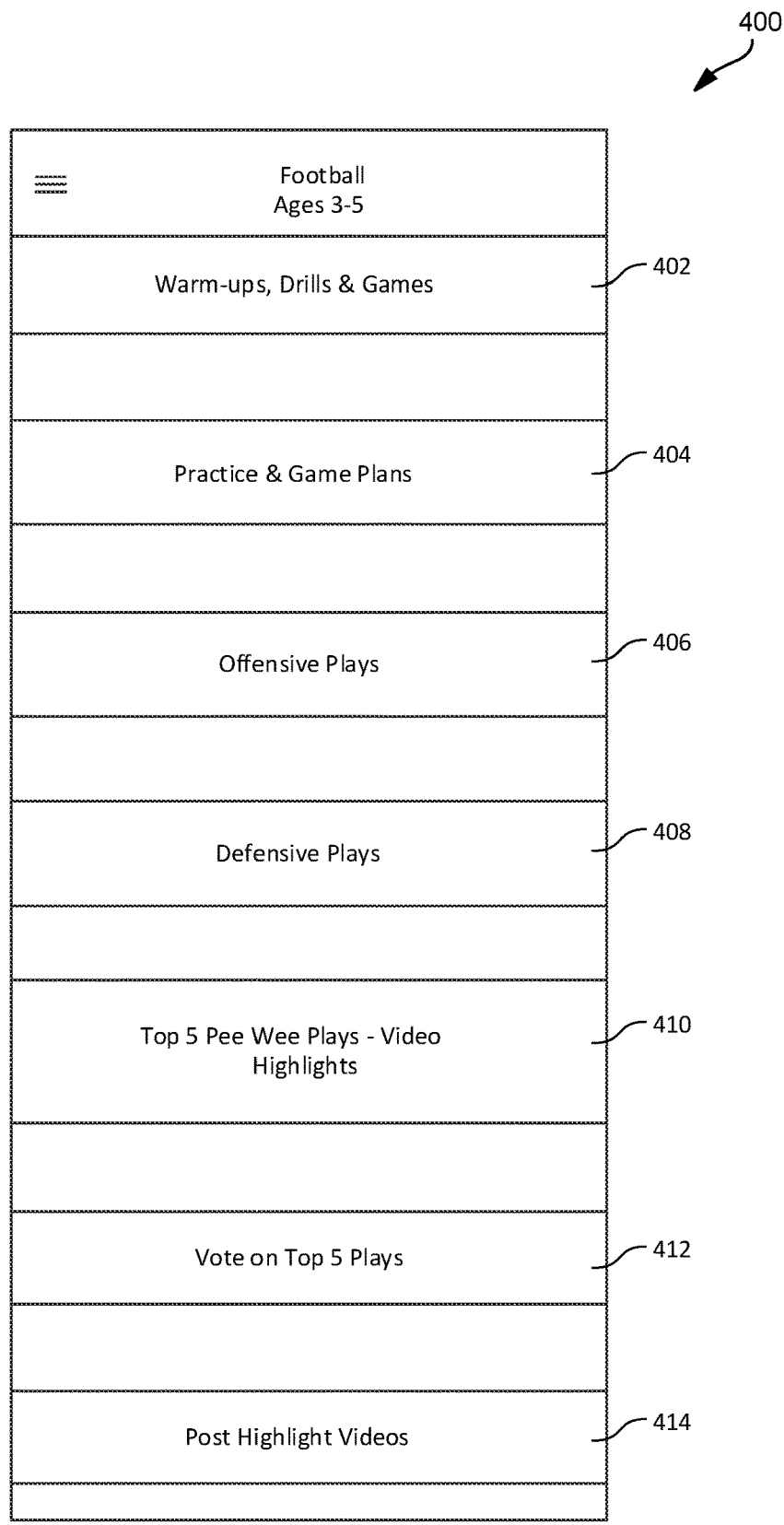
FIG. 4 through FIG. 7B are diagrams illustrating example interfaces for content provided by an integrated platform in an integrated sports system, in accordance with some examples of the present disclosure.

FIG. 4 illustrates an example interface 400 associated with smart ball 140. The interface 400 and/or associated content can be hosted on the integrated platform 110. A user can access the interface 400 by placing the client device 150 and smart ball 140 within a wireless range of each other. The client device 150 can obtain information from the chip 145 in the smart ball 140 and use the information to access the interface 400 and/or retrieve the associated content from the integrated platform 110.

In this example, the interface 400 is associated with a smart football designed for kids of ages 3 to 5. The content in the interface 400 can thus include football-related content for kids of ages 3 to 5. The interface 400 includes menus 402-414 for accessing different content and/or different types of content. In some cases, the menus 402-414 can include menus for accessing instructional football content for kids of ages 3 to 5. For example, menu 402 can allow a user to access information (e.g., instructions, illustrations, examples, plans, guides, notes, comments, suggestions, statistics, examples, animations, videos, posts, links, reference materials, descriptions, explanations, etc.) for football warm-ups, drills and/or games for kids ages 3 to 5. The information can include warm-ups designed for kids ages 3 to 5, drills designed for kids of ages 3 to 5, games of/for kids ages 3 to 5, etc.

Menu 404 can allow a user to access practice and/or game plans designed for kids ages 3 to 5, such as routines, formations, plays, strategies, etc. Menu 406 can allow a user to access offensive plays designed for kids ages 3 to 5. The offensive plays can include explanations, guides, examples, illustrations, instructions, animations, videos, reference materials, descriptions, comments, tutorials, steps, and/or any other information that can illustrate, instruct, explain, etc., the offensive plays.

Menu 408 can allow a user to access defensive plays designed for kids ages 3 to 5. The defensive plays can include explanations, guides, examples, illustrations, instructions, animations, videos, reference materials, descriptions, comments, tutorials, steps, and/or any other information that can illustrate, instruct, explain, etc., the defensive plays.

Menu 410 can allow a user to access video highlights (and/or any other types of highlights) for kids ages 3 to 5. In some examples, the video highlights can include, for example, a top number of video highlights, such as a top n number of highest ranked/rated video highlights and/or of video highlights having a highest number of views. In other examples, the video highlights can include a number of video highlights selected by one or more users and/or configured on the system. In other examples, the video highlights can include any other or number of video highlights.

Menu 412 can allow a user to access a voting interface or feature for voting on specific items such as, for example, plays, video highlights, drills, practice plans, game plans, games, instructional content, etc.

Menu 414 can allow a user to post football-related content for kids ages 3 to 5. For example, menu 414 can allow a user to post videos, comments, plays, game plans, suggestions, practice plans, drills, highlight content (e.g., videos, plans, plays, drills, etc.), and/or any other type of content.

The menus 402-414 shown in FIG. 4 are merely illustrative examples provided for explanation purposes. It should be noted that, in other examples, the interface 400 can include other menus and/or content that are not shown in FIG. 4. For example, in some cases, the interface 400 (and/or any of the menus 402-414) can include an interface element where users can provide game statistics. The system can use the game statistics entered by a user(s) to track game statistics and information, identify patterns, rank players (e.g., by region, league, age and/or age group, division, sport, overall, and/or in any other way), rank teams, rank plays, etc.

Figure 5:
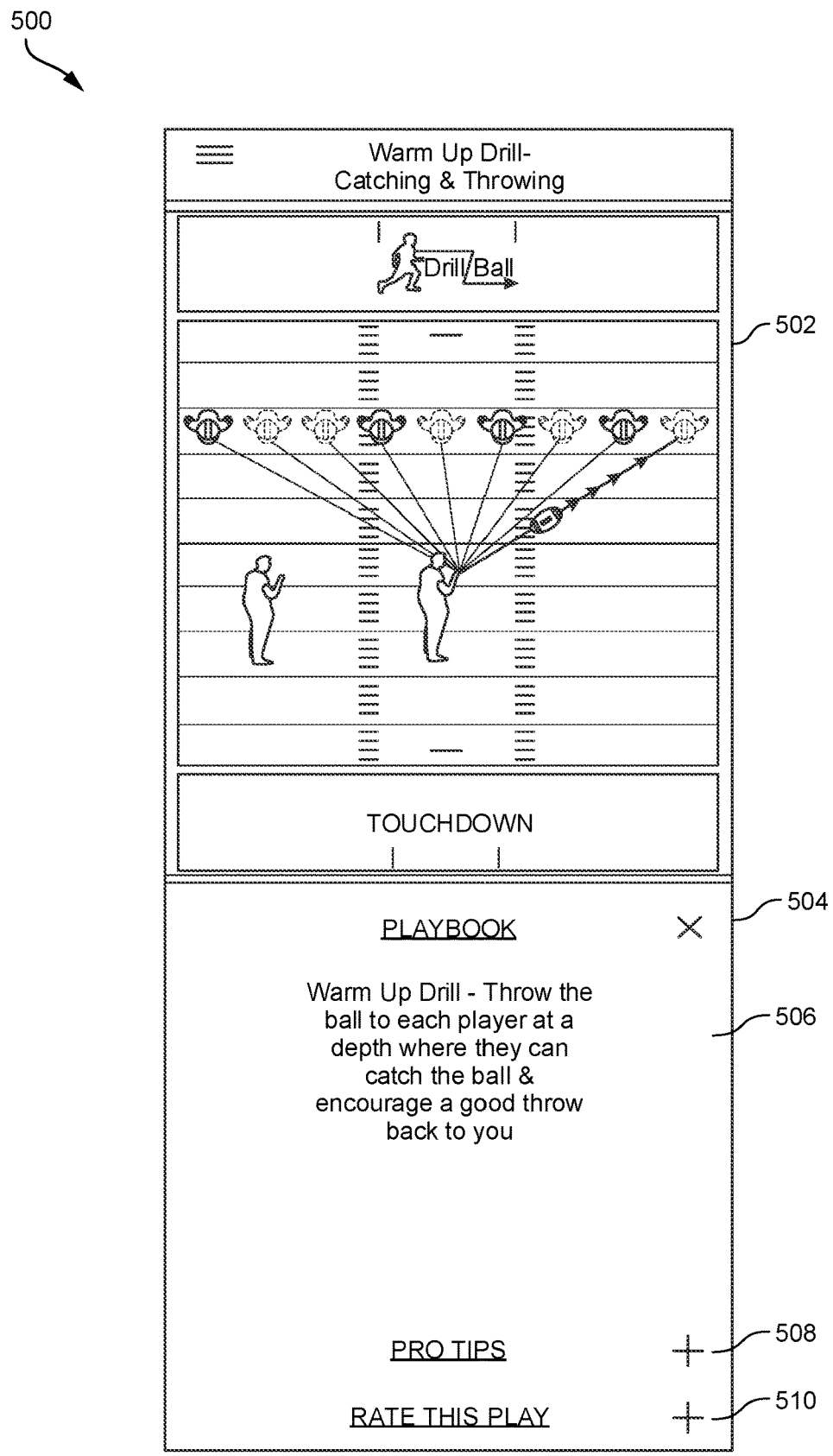

FIG. 5 illustrates an example interface 500 for an example warm-up drill that can be accessed from menu 402 in the interface 400 shown in FIG. 4. In this example, the warm-up drill includes a drill for throwing and catching a football. In this example, since the interface 500 is accessed from the interface 400 shown in FIG. 4, the drill can be designed for kids ages 3-5.

The interface 500 can include a graphical section 502 that visually shows/depicts how the drill is performed. In some examples, the graphical section 502 can depict the drill in an example football field showing the players (e.g., the defensive and/or offensive players) on the field and/or involved in the drill. The graphical section 502 can visually illustrate and/or describe what actions are performed by one or more players involved in the drill. For example, the graphical section 502 can include graphical representations of players, the ball, the field, etc., as well as graphical representations of movements of the players and/or the ball (e.g., via lines, visual representations of motion, comments/notes, symbols, characters, numbers, colors, visual patterns, animations, directional elements, etc.). In some cases, the graphical section 502 can include other information such as timing, distance, statistics, labels, etc.

In some examples, the interface 500 can include a menu 504 for accessing playbook content, a menu 508 for accessing tips (e.g., suggestions, insights, etc.), and/or a menu 510 for rating content provided by the interface 500, such as the drill in graphical section 502. In the example shown in FIG. 5, the user has selected the playbook menu 508 to access content within the playbook menu 508. Here, the user has access drill section 506 which provides information about the warm-up drill depicted in the graphical section 502. The information can provide instructions for how to conduct the warm-up drill and/or any other information.

Figure 6:
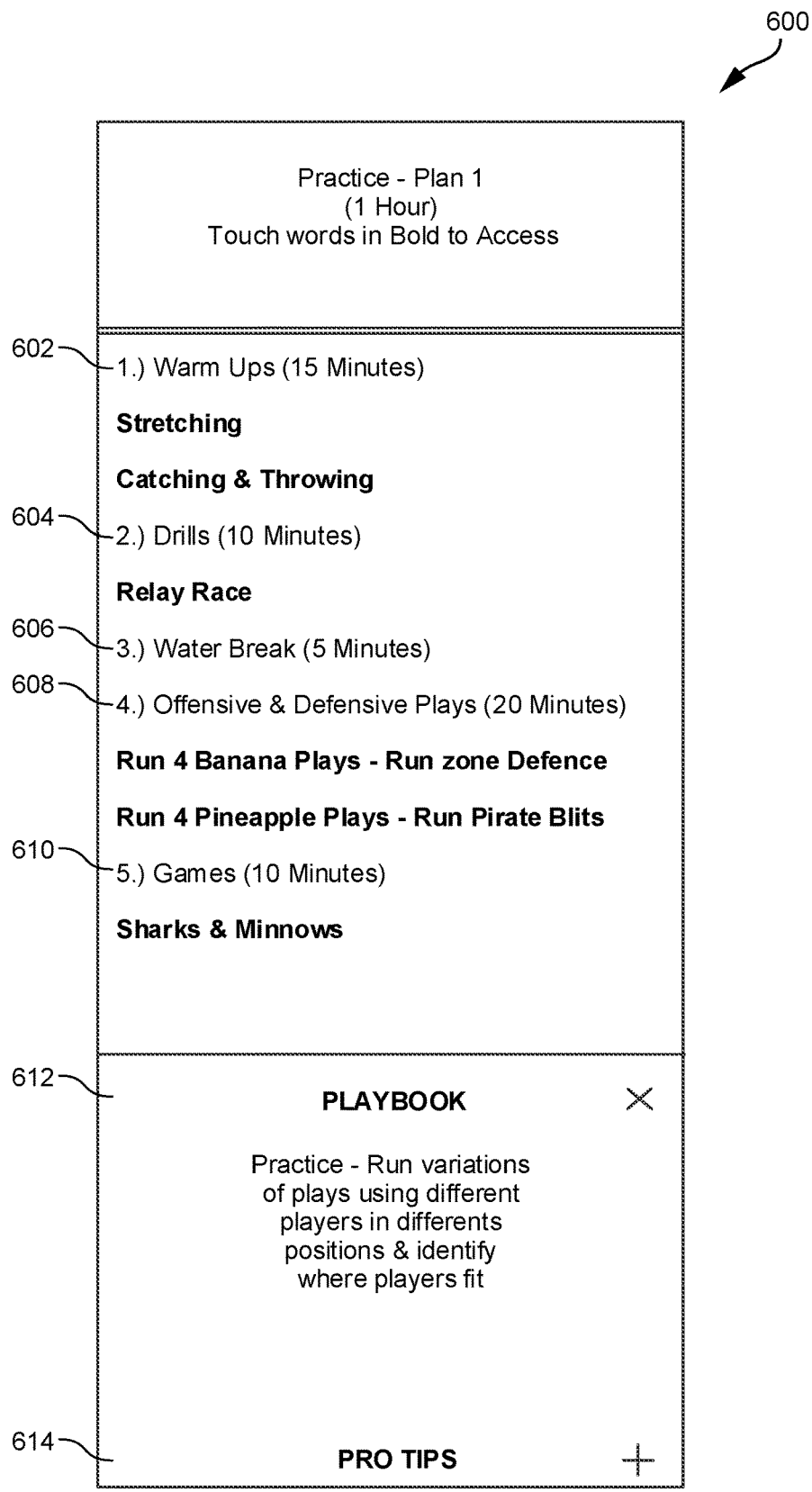

FIG. 6 illustrates an example interface 600 for an example practice plan. In this example, the example interface 600 can be accessed from menu 404 of interface 400 shown in FIG. 4. The practice plan can include any content, instructions, activities, etc., included in the example practice plan.

The interface 600 can include interface items 602-610, which can include menus, information, listings, etc., of activities and/or components of the example practice plan. In some cases, the interface items 602-610 can be organized/ordered according to how they are sequentially implemented/performed/prescribed in the practice plan.

In this example, the interface items 602-610 first include a warm-ups interface item 602 which can indicate that the first component/activity of the practice plan includes one or more warm ups and/or a certain amount of time for warm-ups. In some cases, the warm-ups interface item 602 can include instructional information for one or more warm-ups, such as a list of warm-up exercises and/or activities. In some cases, the warm-up exercises and/or activities can include descriptions and/or can be selected to access specific instructions for those warm-up exercises and/or activities.

The interface items 602-610 can then include a drills interface item 604 which can indicate that the next component/activity of the practice plan includes one or more drills and/or a certain amount of time for drills. In some cases, the drills interface item 604 can include instructional information for one or more drills, such as a list of drills. In some cases, the drill(s) can include descriptions of the drills and/or can be selected to access specific instructions for the drill(s).

The interface items 602-610 can then include a water break interface item 606 which can indicate that the next component/activity of the practice plan includes a water break and/or a certain amount of time for a water break. In some cases, the water break interface item 606 can include instructional information for the water break, such as breathing instructions, drinking instructions, break instructions, etc.

The interface items 602-610 can also include a plays interface item 608 which can indicate that the next component/activity of the practice plan includes a one or more plays and/or a certain amount of time for plays. In some cases, the plays interface item 608 can include instructional information for one or more plays, such as a list of plays, etc. In some cases, the play(s) can include descriptions of the plays and/or can be selected to access specific instructions for the play(s).

The interface items 602-610 can also include a games interface item 610 which can indicate that the next component/activity of the practice plan includes a one or more games and/or a certain amount of time for one or more games. In some cases, the games interface item 610 can include instructional information for one or more games, such as a list of games, etc. In some cases, the game(s) can include descriptions of the game(s) and/or can be selected to access specific instructions for the game(s).

In some examples, the interface 600 can include a menu 612 for accessing playbook content and a menu 614 for accessing tips (e.g., suggestions, insights, etc.). In the example shown in FIG. 6, the user has selected the playbook menu 612 to access content within the playbook menu 612. Here, the playbook menu 612 has expanded to provide information about the example practice such as instructions, descriptions/details, etc.

Figure 7A:
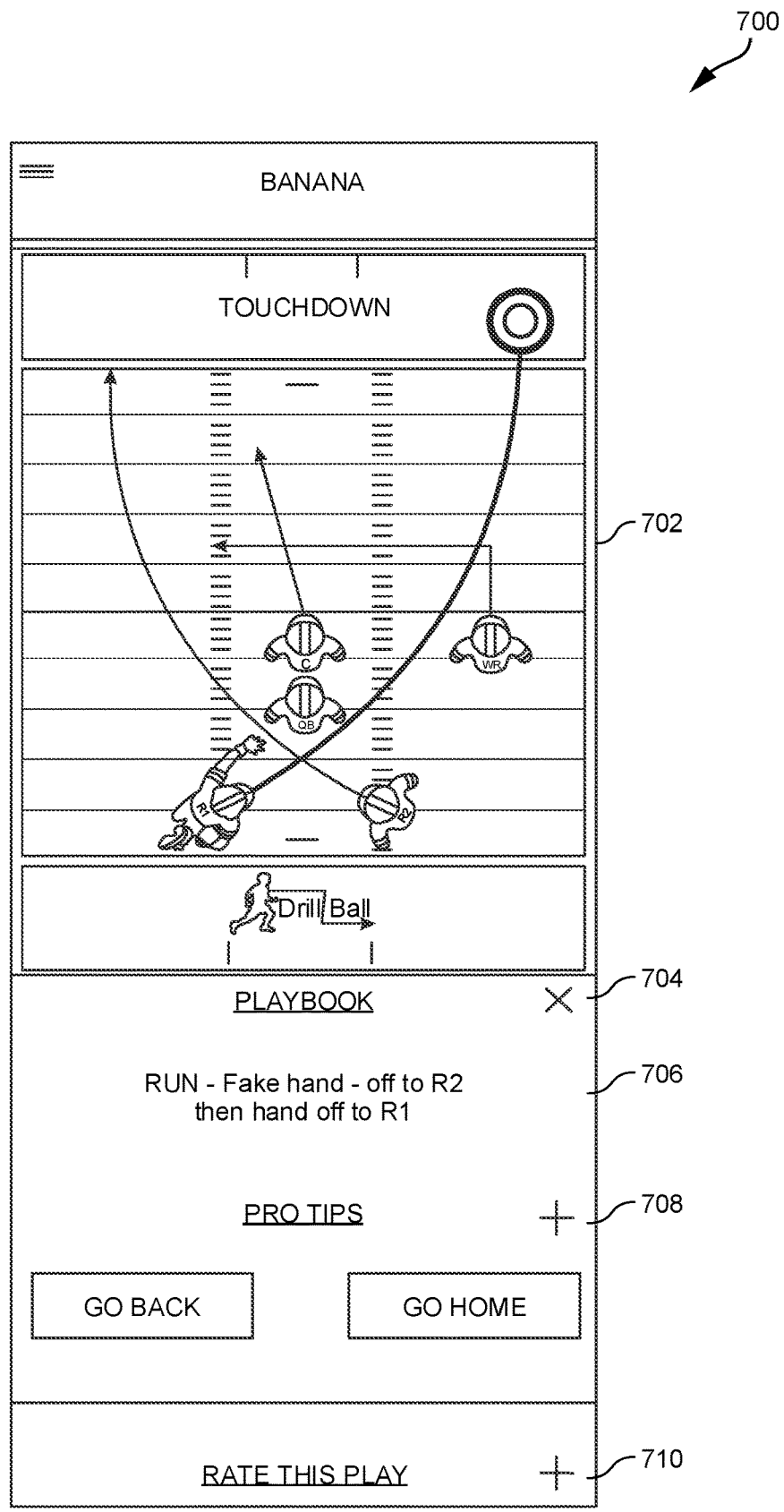

FIG. 7A illustrates an example interface 700 for an example play. In this example, the example interface 700 can be accessed from menu 406 or menu 408 of interface 400 shown in FIG. 4. The play can include any content, instructions, activities, etc., associated with the play.

The interface 700 can include a graphical section 702 that visually shows/depicts how the play is performed. In some examples, the graphical section 702 can depict the play in an example football field showing the players (e.g., the defensive and/or offensive players) on the field and/or involved in the play. The graphical section 702 can visually illustrate and/or describe what actions are performed by one or more players involved in the play. For example, the graphical section 702 can include graphical representations of players, the ball, the field, the play, etc., as well as graphical representations of movements of the players and/or the ball (e.g., via lines, visual representations of motion, comments/notes, symbols, characters, numbers, colors, visual patterns, animations, directional elements, etc.). In some cases, the graphical section 702 can include other information such as timing, distance, statistics, labels, etc.

In some examples, the interface 700 can include a menu 704 for accessing playbook content, a menu 708 for accessing tips (e.g., suggestions, insights, etc.), and/or a menu 710 for rating content provided by the interface 500, such as the play in graphical section 702. In the example shown in FIG. 7A, the user has selected the playbook menu 708 to access content within the playbook menu 708. Here, the user has access play section 706 which provides information about the play depicted in the graphical section 702. The information can provide instructions for how to conduct/perform the play and/or any other information.

Figure 7B:
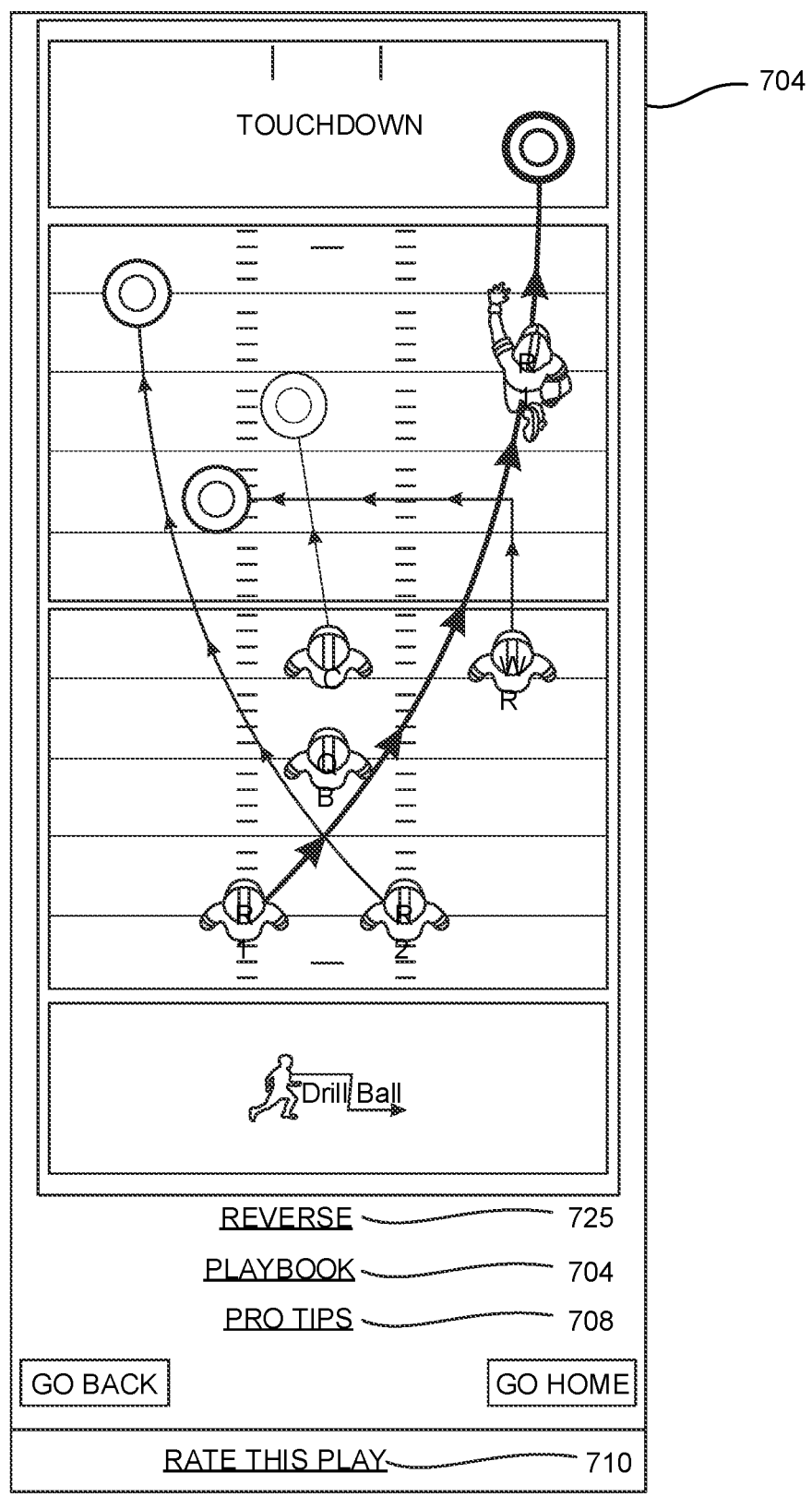

FIG. 7B illustrates another view or configuration of the example interface 700 for the example play. In this example, the interface also includes a reverse menu 725. Moreover, the graphical section 702 includes more graphical details for visualizing the play actions, such as arrows, colors, and any other visual indicators.

As previously noted, users can access the interfaces 300-700 through their client device 150 from anywhere. For example, a user, such as a coach, can access the interfaces 300-700 from the user's mobile phone or smart watch during a game or practice and use the information/content available through the interfaces 300-700 provide guidance during the game or practice. To illustrate, a coach can place their smart watch or mobile phone within a threshold distance of the ball 140 and chip 145 to access the interface 400 shown in FIG. 4. The coach can then select the practice and game plans menu (e.g., 404) in interface 400 to access practice and/or game information (e.g., instructional information, content, statistics, etc.) through the smart watch or mobile phone. In an illustrative example, the coach can view player routes, strategies, game/practice tips, etc., through the smart watch or mobile phone during the game or practice and use such information to help guide the practice or game.

In some examples, a smart ball (e.g., smart ball 140) and/or its associated content can integrate with other devices and/or data from other devices. For example, content associated with a smart ball and hosted on the integrated platform (e.g., integrated platform 110) (and accessible through any of the interfaces 300-700) can be integrated with data from other sensors available during a practice or game, such as heart rate sensors, blood pressure sensors, hydration sensors, motion sensors, heat sensors, humidity sensors, image sensors, etc. The combined data from the sensors and the integrated platform can provide instructional information, suggestions, tips, notifications, and/or any other information to users in the practice or game, and can be used to tailor aspects of the practice or game. For example, data from hydration and/or heat sensors can be integrated with practice/training data during a practice, such as drills, exercises, water breaks, etc. The practice/training data can change to account for the data from the sensors so the information is better tailored to the current context/circumstances. To illustrate, hydration and/or heat sensor data can be used to increase the timing of water breaks and/or adjust the intensity of the training/practice (e.g., decrease the intensity when the sensor data indicates heat and/or hydration issues or increase the intensity when the sensor data confirms that heat and/or hydration is not an issue or a limited risk exists).

In other examples, the integrated platform can stream content associated with a smart ball to a device(s) during a game, training/practice, and/or any other event/circumstance. In some cases, the integrated platform can merge such data with game or practice data (e.g., which can be collected and/or received by the integrated platform) such as scores, game/practice time, timeout information, formation information, substitutes, statistics, etc. The merged data can provide users data more relevant and/or tailored to a current context/circumstance, such as a game or practice. Moreover, in some cases, the merged data can be tailored based on the game or practice data, as previously explained with respect to sensor data, to tailor content associated with the smart ball to the current game or practice.

Moreover, as previously explained, the interfaces 300-700 can be web-based or website interfaces accessed through a web browser. However, in other examples, the interfaces 300-700 can be applications and/or application interfaces accessible through a local application on a client device. In some examples, the content accessible through the interfaces 300-700 can change and/or evolve. For example, the interfaces 300-700 can include content associated with a specific ball (e.g., 140). Such content can be updated and/or modified even after the ball is purchased by a user. To illustrate, a basketball designed for kids ages 10-12 can be used to access basketball content (e.g., through interfaces 300-700) for kids ages 10-12. However, the basketball content associated with that basketball need not be static and/or remain static after the basketball is purchased by the user. Instead, the basketball content can be updated and/or modified at any time, including after the purchase of the basketball. Accordingly, the basketball can enable access to new, old, and/or evolving basketball and other content.

The interfaces 300-700 and associated menus/content shown in FIGS. 3 through 7B are merely illustrative examples provided for explanation purposes. It should be noted that, in other examples, the interfaces 300-700 and associated menus/content can include other interface elements, menus and/or content that are not shown in FIGS. 3 through 7B and the integrated platform (e.g., 110) can host other interfaces that are not shown in FIGS. 3 through 7B. Having disclosed example systems, components and concepts, the disclosure now turns to the example method 800 for providing content associated with a smart ball (e.g., smart ball 140), as shown in FIG. 8. The steps outlined herein are non-limiting examples provided for illustration purposes, and can be implemented in any combination thereof, including combinations that exclude, add, or modify certain steps.

At block 802, the method 800 can include receiving, by an integrated platform system (e.g., integrated platform 110) and from a client device (e.g., client device 150), a request for content (e.g., interface 200, 300, 400, 500, 600, or 700) associated with a smart ball (e.g., smart ball 140) having a communications device (e.g., chip 145) from which an address for the content was obtained by the client device.

At block 804, the method 800 can include in response to the request, retrieving, by the integrated platform system, the content associated with the ball. At block 806, the method 800 can include providing (e.g., serving, sending, etc.), by the integrated platform system, the content to the client device.

In some examples, the integrated platform system can retrieve the content based on the address. In some cases, the content can include instructional information associated with the ball, a sport associated with the ball, an age group associated with the ball, a type of ball, a category of use of the ball, and/or a user associated with the ball. In some examples, the instructional information is specific to the sport associated with the ball and the category of use of the ball. The category of use can include, for example, a type of use for which the ball was designed (e.g., competitive use, recreational use, school league, professional league, youth league, practice, training, certain drill(s), etc.) and/or a category of users for which the ball was designed. In some examples, the category of users can include an age group, a competitive user, a recreational user, a coach, etc.

In some aspects, the address can include a uniform resource locator (URL), a uniform resource identifier (URI), an Internet Protocol address, and/or a domain name. Moreover, in some cases, the content can include a web page.

In some examples, the communications device can include anon-transitory computer-readable medium having computer-readable information stored thereon and an electronic component for wirelessly communicating the address to the client device. In some cases, the computer-readable information can include the address of content. In some aspects, the electronic component can include a wireless interface and/or an integrated circuit. The electronic component can be configured to wirelessly communicate with the client device via radio signals and/or resonant energy transfer.

In some cases, the communications device can include a near-field communication chip or a proximity card. Moreover, in some examples, the communications device is attached to an inner surface of the ball. The ball can include, for example, a football, a soccer ball, a volleyball, a basketball, a tennis ball, a rugby ball, etc.

In some examples, the method 800 may be performed by one or more computing devices or apparatuses. In one illustrative example, the method 800 can be performed by the integrated platform 110 shown in FIG. 1 and/or one or more computing devices with the computing device architecture 900 shown in FIG. 9. In some cases, such a computing device or apparatus may include a processor, microprocessor, microcomputer, or other component of a device that is configured to carry out the steps of the method 800.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 800 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an example computing device architecture 900 of an example computing device which can implement various techniques described herein. For example, the computing device architecture 900 can implement at least some portions of the integrated platform 110 and/or the client device 150 shown in FIG. 1. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service (e.g., service 1 932, service 2 934, and service 3 936) stored in storage device 930 and configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device. In some instances, multimodal computing devices can enable a user to provide multiple types of input to communicate with the computing device architecture 900. The communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include service 932, service 934, and service 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1. A system comprising: a smart ball comprising a communications device for wirelessly communicating with a client device, communications device comprising: a non-transitory computer-readable medium having computer-readable information stored thereon, the computer-readable information comprising an address of content hosted on an integrated platform, the content comprising instructional information associated with at least one of the smart ball, a sport associated with the smart ball, an age group associated with the smart ball, a type of smart ball, a category of use of the smart ball, and a user associated with the smart ball; and an electronic circuit for wirelessly communicating the address to the client device; and the integrated platform, wherein the integrated platform comprises one or more processors and at least one non-transitory computer-readable medium having stored thereon computer-readable instructions which, when executed by the one or more processors, cause the one or more processors to: receive, from the client device and over a network, a request for at least a portion of the content associated with the smart ball; in response to the request, retrieve at least the portion of the content associated with the smart ball; and provide at least the portion of the content to the client device.

Aspect 2. The system of Aspect 1, wherein the electronic circuit is configured to communicate the address to the client device using at least one of radio frequency signals, resonant energy transfer, and near-field communications.

Aspect 3. The system of any of Aspects 1 to 2, wherein the instructional information is specific to the sport associated with the smart ball and the category of use of the smart ball, wherein the category of use comprises at least one of a type of use for which the smart ball was designed and a category of users for which the smart ball was designed, the category of users comprising at least one of an age group, a competitive user, a recreational user, and a coach.

Aspect 4. The system of any of Aspects 1 to 3, wherein the address comprises at least one of a uniform resource locator (URL), a uniform resource identifier (URI), an Internet Protocol address, and a domain name.

Aspect 5. The system of any of Aspects 1 to 4, wherein the content comprises a web page, and wherein the electronic circuit comprises at least one of a wireless interface and integrated circuitry.

Aspect 6. The system of any of Aspects 1 to 5, wherein the communications device comprises a near-field communication chip or a proximity card.

Aspect 7. The system of any of Aspects 1 to 6, wherein the communications device is attached to an inner surface of the smart ball.

Aspect 8. The system of any of Aspects 1 to 7, wherein the smart ball comprises one of a football, a soccer ball, a volleyball, a basketball, a tennis ball, or a rugby ball.

Aspect 9. The system of any of Aspects 1 to 8, wherein the smart ball comprises one or more sensors, the one or more sensors comprising at least one of an accelerometer, a gyroscope, a magnetometer, a pressure sensor, a barometer, and a force sensor, and wherein the electronic circuit is configured to wirelessly communicate data from the one or more sensors to at least one of the client device and the integrated platform, the data comprising one or more measurements comprising at least one of a smart ball speed or velocity measurement, a smart ball pressure, a smart ball trajectory, a force applied on the smart ball, and a measured elevation of the smart ball.

Aspect 10. The system of any of Aspects 1 to 9, wherein the content further comprises data submitted by one or more users associated with the smart ball, the data submitted by the one or more users comprising at least one of a video, a content suggestion, a content recommendation, additional instructional content, a message, a blog, user information, user competition statistics, user training statistics, and one or more plays, drills, and/or exercises created/designed by a user associated with the smart ball.

Aspect 11. A smart ball comprising: a communications device for wirelessly communicating with a client device, the communications device comprising: a non-transitory computer-readable medium having computer-readable information stored thereon, the computer-readable information comprising an address of content hosted on an integrated platform, the content comprising instructional information associated with at least one of the smart ball, a sport associated with the smart ball, an age group associated with the smart ball, a type of smart ball, a category of use of the smart ball, and a user associated with the smart ball; and an electronic circuit configured to wirelessly communicate the address to the client device.

Aspect 12. The smart ball of Aspect 11, wherein the electronic circuit comprises at least one of a wireless interface and integrated circuitry.

Aspect 13. The smart ball of any of Aspects 11 to 12, wherein the electronic circuit is configured to wirelessly communicate with the client device via at least one of radio signals, near-field communications, and resonant energy transfer.

Aspect 14. The smart ball of any of Aspects 11 to 13, wherein the communications device comprises a near-field communication chip or a proximity card.

Aspect 15. The smart ball of any of Aspects 11 to 14, wherein the communications device is attached to an inner surface of the smart ball.

Aspect 16. The smart ball of any of Aspects 11 to 15, wherein the smart ball comprises one of a football, a soccer ball, a volleyball, a basketball, a tennis ball, or a rugby ball.

Aspect 17. The smart ball of any of Aspects 11 to 16, further comprising one or more sensors attached to an inner surface of the smart ball, the one or more sensors comprising at least one of an accelerometer, a gyroscope, a magnetometer, a pressure sensor, a barometer, and a force sensor, and wherein the electronic circuit is configured to wirelessly communicate data from the one or more sensors to at least one of the client device and the integrated platform, the data comprising one or more measurements comprising at least one of a smart ball speed or velocity measurement, a smart ball pressure, a smart ball trajectory, a force applied on the smart ball, and a measured elevation of the smart ball.

Aspect 18. The smart ball of any of Aspects 11 to 17, wherein the client device comprises a mobile device.

Aspect 19. A method comprising: receiving, by an integrated platform from a client device, a request for content associated with a smart ball having a communications device configured to communicate an address for the content to one or more client devices, the request being based on the address from the smart ball; in response to the request, retrieving, by the integrated platform, the content associated with the smart ball; and providing, by the integrated platform, the content to the client device.

Aspect 20. The method of Aspect 19, wherein the content comprises instructional information associated with at least one of the smart ball, a sport associated with the smart ball, an age group associated with the smart ball, a type of smart ball, a category of use of the smart ball, and a user associated with the smart ball.

Aspect 21. The method of any of Aspects 19 to 20, and wherein the communications device comprises a non-transitory computer-readable medium having computer-readable information stored thereon, the computer-readable information comprising the address.

Aspect 22. The method of any of Aspects 19 to 21, wherein the communications device is configured to communicate the address via at least one of radio signals, near-field communications, and resonant energy transfer.

Aspect 23. The method of any of Aspects 19 to 22, wherein the client device comprises a mobile device.

Aspect 24. The method of any of Aspects 19 to 23, wherein the smart ball comprises one of a football, a soccer ball, a volleyball, a basketball, a tennis ball, or a rugby ball.

Aspect 25. The method of any of Aspects 19 to 24, wherein the content comprises instructional information associated with at least one of the smart ball, a sport associated with the smart ball, an age group associated with the smart ball, a type of smart ball, a category of use of the smart ball, and a user associated with the smart ball, wherein the instructional information is specific to the sport associated with the smart ball and the category of use of the smart ball, wherein the category of use comprises at least one of a type of use for which the smart ball was designed and a category of users for which the smart ball was designed, the category of users comprising at least one of an age group, a competitive user, a recreational user, and a coach.

Aspect 26. The method of any of Aspects 19 to 25, wherein the address comprises at least one of a uniform resource locator (URL), a uniform resource identifier (URI), an Internet Protocol address, and a domain name.

Aspect 27. The method of any of Aspects 19 to 26, wherein the content comprises a web page, and wherein the communications device comprises at least one of a wireless interface and integrated circuitry.

Aspect 28. The method of any of Aspects 19 to 27, wherein the communications device comprises a near-field communication chip or a proximity card.

Aspect 29. The method of any of Aspects 19 to 28, wherein the communications device is attached to an inner surface of the smart ball.

Aspect 30. The method of any of Aspects 19 to 29, wherein the smart ball comprises one or more sensors, the one or more sensors comprising at least one of an accelerometer, a gyroscope, a magnetometer, a pressure sensor, a barometer, and a force sensor, and wherein the communications device is configured to wirelessly communicate data from the one or more sensors to at least one of the client device and the integrated platform, the data comprising one or more measurements comprising at least one of a smart ball speed or velocity measurement, a smart ball pressure, a smart ball trajectory, a force applied on the smart ball, and a measured elevation of the smart ball.

Aspect 31. The method of any of Aspects 19 to 30, wherein the content further comprises data submitted by one or more users associated with the smart ball, the data submitted by the one or more users comprising at least one of a video, a content suggestion, a content recommendation, additional instructional content, a message, a blog, user information, user competition statistics, user training statistics, and one or more plays, drills, and/or exercises created/designed by a user associated with the smart ball.

Aspect 32. A system comprising means for performing a method according to any of Aspects 19 to 30.

Aspect 33. A non-transitory computer-readable medium having stored thereon instructions which, when executed by one or more processors, cause the one or more processors to perform a method according to any of Aspects 19 to 30.

What is claimed is:

1. A system comprising:
   a smart ball comprising a communications device for wirelessly communicating with a client device, communications device comprising:
      a non-transitory computer-readable medium having computer-readable information stored thereon, the computer-readable information comprising an address of content hosted on an integrated platform, the content comprising instructional information associated with at least one of the smart ball, a sport associated with the smart ball, an age group associated with the smart ball, a type of smart ball, a category of use of the smart ball, and a user associated with the smart ball; and
      an electronic circuit for wirelessly communicating the address to the client device; and
   the integrated platform, wherein the integrated platform comprises one or more processors and at least one non-transitory computer-readable medium having stored thereon computer-readable instructions which, when executed by the one or more processors, cause the one or more processors to:
      receive, from the client device and over a network, a request for at least a portion of the content associated with the smart ball;
      in response to the request, retrieve at least the portion of the content associated with the smart ball; and
      provide at least the portion of the content to the client device.

2. The system of claim 1, wherein the electronic circuit is configured to communicate the address to the client device using at least one of radio frequency signals, resonant energy transfer, and near-field communications.

3. The system of claim 1, wherein the instructional information is specific to the sport associated with the smart ball and the category of use of the smart ball, wherein the category of use comprises at least one of a type of use for which the smart ball was designed and a category of users for which the smart ball was designed, the category of users comprising at least one of an age group, a competitive user, a recreational user, and a coach.

4. The system of claim 1, wherein the address comprises at least one of a uniform resource locator (URL), a uniform resource identifier (URI), an Internet Protocol address, and a domain name.

5. The system of claim 1, wherein the content comprises a web page, and wherein the electronic circuit comprises at least one of a wireless interface and integrated circuitry.

6. The system of claim 1, wherein the communications device comprises a near-field communication chip or a proximity card.

7. The system of claim 1, wherein the communications device is attached to an inner surface of the smart ball.

8. The system of claim 1, wherein the smart ball comprises one of a football, a soccer ball, a volleyball, a basketball, a tennis ball, or a rugby ball.

9. The system of claim 1, wherein the smart ball comprises one or more sensors, the one or more sensors comprising at least one of an accelerometer, a gyroscope, a magnetometer, a pressure sensor, a barometer, and a force sensor, and wherein the electronic circuit is configured to wirelessly communicate data from the one or more sensors to at least one of the client device and the integrated platform, the data comprising one or more measurements comprising at least one of a smart ball speed or velocity measurement, a pressure of the smart ball, a smart ball trajectory, a force applied on the smart ball, and a measured elevation of the smart ball.

10. The system of claim 1, wherein the content further comprises data submitted by one or more users associated with the smart ball, the data submitted by the one or more users comprising at least one of a play created by the one or more users, a drill created by the one or more users, a video, a content suggestion, a content recommendation, additional instructional content, a message, a blog, user information, user competition statistics, and user training statistics.

* * * * *